(12) United States Patent
Cathcart et al.

(10) Patent No.: US 10,303,696 B2
(45) Date of Patent: May 28, 2019

(54) SEARCHING TOPICS BY HIGHEST RANKED PAGE IN A SOCIAL NETWORKING SYSTEM

(71) Applicant: Facebook, Inc., Menlo Park, CA (US)

(72) Inventors: Robert William Cathcart, San Francisco, CA (US); Rafael Linden Sagula, Kirkland, WA (US); Cameron Alexander Marlow, Menlo Park, CA (US); Jonathan Chang, San Francisco, CA (US); Siddharth Kar, San Francisco, CA (US); Eric Sun, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 40 days.

(21) Appl. No.: 14/980,335

(22) Filed: Dec. 28, 2015

(65) Prior Publication Data

US 2016/0132570 A1 May 12, 2016

Related U.S. Application Data

(63) Continuation of application No. 13/295,001, filed on Nov. 11, 2011, now Pat. No. 9,251,500.

(51) Int. Cl.
*G06Q 10/00* (2012.01)
*G06F 16/248* (2019.01)
*G06F 16/28* (2019.01)
*G06F 16/9535* (2019.01)
*G06F 16/2457* (2019.01)
(Continued)

(52) U.S. Cl.
CPC ...... *G06F 16/248* (2019.01); *G06F 16/24578* (2019.01); *G06F 16/285* (2019.01); *G06F 16/9535* (2019.01); *G06Q 10/10* (2013.01); *G06Q 50/01* (2013.01)

(58) Field of Classification Search
CPC .... G06Q 10/10; G06Q 10/101; G06Q 10/103; G06Q 50/01
USPC .......................................................... 709/204
See application file for complete search history.

(56) References Cited

U.S. PATENT DOCUMENTS

| 2003/0229900 A1* | 12/2003 | Reisman ........... G06F 17/30873 725/87 |
| 2006/0122876 A1 | 6/2006 | Von Schweber et al. |
| 2008/0235078 A1 | 9/2008 | Hong et al. |

(Continued)

OTHER PUBLICATIONS

United States Office Action, U.S. Appl. No. 13/295,001, dated May 7, 2015, 15 pages.

(Continued)

*Primary Examiner* — Joseph L Greene
(74) *Attorney, Agent, or Firm* — Fenwick & West LLP

(57) ABSTRACT

Equivalent concepts expressed across multiple domains are matched and associated with a metapage generated by a social networking system. User preferences expressed on multiple domains, represented as pages in a social networking system, may be organized by concept and shared with advertisers, third-party developers, and other users of the social networking system using the metapages generated for the concepts. Aggregated social information may be presented to users of the social networking system viewing a page associated with a metapage. In one embodiment, a best page may be determined for a user based on information about the user.

16 Claims, 5 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 2009/0089372 A1* | 4/2009 | Sacco | G06F 17/3089 |
| | | | 709/204 |
| 2009/0276459 A1* | 11/2009 | Trout | G06Q 10/10 |
| 2010/0205541 A1 | 8/2010 | Rapaport et al. | |
| 2011/0106829 A1* | 5/2011 | Pradhan | G06F 17/30699 |
| | | | 707/765 |
| 2012/0331049 A1* | 12/2012 | Deeter | G06Q 50/01 |
| | | | 709/204 |

OTHER PUBLICATIONS

United States Office Action, U.S. Appl. No. 13/295,001, dated Sep. 11, 2014, 14 pages.

* cited by examiner

US 10,303,696 B2

SEARCHING TOPICS BY HIGHEST RANKED PAGE IN A SOCIAL NETWORKING SYSTEM

CROSS-REFERENCE TO RELATED APPLICATION

This application is a continuation application of U.S. patent application Ser. No. 13/295,001, filed Nov. 11, 2011, which is incorporated by reference herein its entirety.

BACKGROUND

This invention relates generally to social networking, and in particular to searching topics by highest ranked page in a social networking system.

In recent years, social networking systems have made it easier for users to share their interests and preferences in real-world concepts, such as their favorite movies, musicians, celebrities, soft drinks, hobbies, sports teams, and activities. Tools have been designed to create nodes on the social networking system that represent web pages that embody these real-world concepts on different domains external to the social networking system. As a result, multiple pages may exist about equivalent real-world concepts.

At the same time, users of social networking systems have shared their interests and engaged with other users of the social networking systems by expressing their interests in these concepts on web pages on different domains external to the social networking system. The amount of information gathered from users is staggering—information describing interests in sports, music, movies, and the like. Social networking systems have recorded this information to personalize the user experience, but social networking systems have lacked tools to enable third-party developers to use this user preference information because of the duplicative pages that have been created on equivalent topics.

Specifically, the information available on social networking systems about users' interests has not been organized to present a singular object for equivalent concepts expressed across different domains. Information about users' interests and preferences is very valuable to third-party developers that seek to drive traffic and increase engagement with their websites. Advertisers may also benefit from this information in marketing interest-based goods and services to users of the social networking system. However, existing systems have not provided efficient mechanisms of organizing and sharing this valuable user preference information.

SUMMARY

Equivalent concepts expressed across multiple domains are matched and associated with a metapage generated by a social networking system. User preferences expressed on multiple domains, represented as pages in a social networking system, may be organized by concept and shared with advertisers, third-party developers, and other users of the social networking system using the metapages generated for the concepts. Aggregated social information may be presented to users of the social networking system viewing a page associated with a metapage. Information presented on external websites may be used to link pages across multiple domains with a metapage generated on the social networking system. In one embodiment, the information on other external websites associated with the metapage may be presented as links on the pages associated with the metapage. Feedback from users may be used to include or exclude pages from being associated with a generated metapage. In one embodiment, a best page may be determined for a concept embodied in multiple pages on the social networking system using a hierarchy of rules. In another embodiment, a best page may be determined for a user based on information about the user. In yet another embodiment, social context information may be provided on a page associated with a metapage for a viewing user that shows expressions of interest by other users on the page and other pages associated with the metapage.

Figure 1:
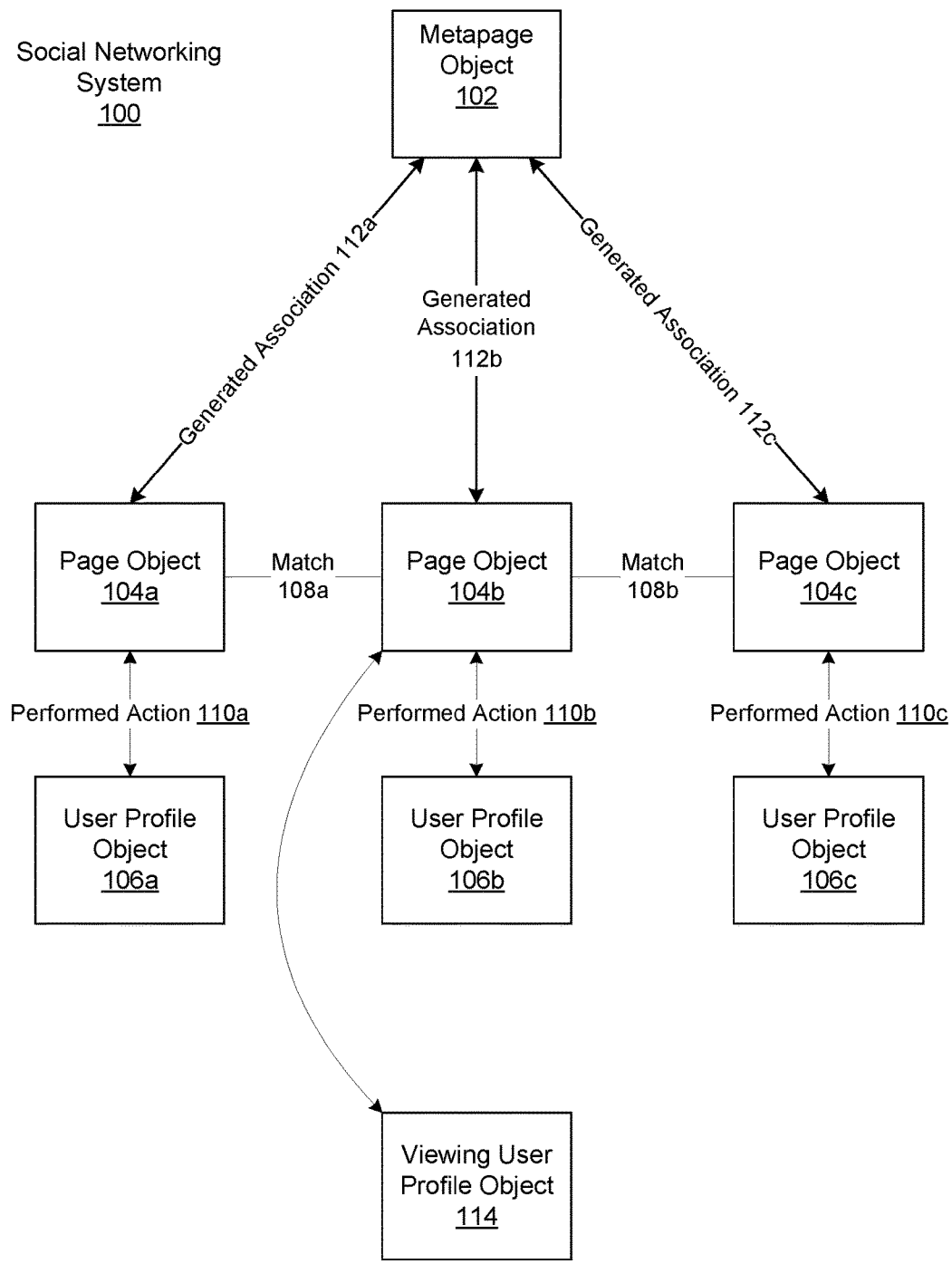
FIG. 1 is high level block diagram illustrating a process of enabling preference portability for users of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

A social graph includes nodes connected by edges that are stored on a social networking system. Nodes include users and objects of the social networking system, such as web pages embodying concepts, and edges connect the nodes. Edges represent a particular interaction between two nodes, such as when a user expresses an interest in a web page about a new movie, "Bridesmaids." The social graph may record interactions between users of the social networking system as well as interactions between users and objects of the social networking system by storing information in the nodes and edges that represent these interactions. Custom graph objects and graph actions may be defined by third-party developers as well as administrators of the social networking system to define attributes of the graph objects and graph actions. For example, a graph object for a movie may have several defined attributes, such as title, actors, directors, producers, year, and the like.

Third-party developers may enable users of the social networking system to express interest in web pages hosted on websites external to the social networking system. These web pages may be represented as page objects in the social networking system as a result of embedding a widget, a social plugin, programmable logic or code snippet into the web pages, such as an iFrame. Any concept that can be embodied in a web page may become a node in the social graph on the social networking system in this manner. As a result, there may be multiple page objects that represent the same concept, such as a page hosted on the social networking system created by producers of the movie, multiple websites including user-generated reviews of the "Bridesmaids" movie, an encyclopedia article about the "Bridesmaids" movie, a user-generated fan page of "Bridesmaids" on the social networking system, news articles on external websites about the "Bridesmaids" movie, and the movie production website for the "Bridesmaids" movie. Aggregating the total number of users of the social networking system that are interested in the "Bridesmaids" movie, regardless of which specific page object a user expressed an interest in, provides valuable social information that may influence other users to engage with web pages about the concept. Centralizing information from multiple page objects about a concept under a single metapage object provides more social coverage to users of the social networking system, potentially influencing them to engage with pages associated with the metapage object. The total aggregated information for a concept, such as the "Bridesmaids" movie, may be presented on the pages associated with the metapage.

Identifying page objects that represent equivalent concepts may be performed using various methods. For example, a third-party web page may include links to other third-party web pages about the same topic. The social networking system may use these links to generate a cross-referenced list of third-party web pages about the topic. As another example, page objects may be matched by attributes of the page objects, such as title, actors, and year. In one embodiment, an inexact matching process may be used, such as fuzzy matching for text that recognizes misspellings and using closeness for matching locations in places objects that represent geographic locations on a social networking system. Further, user feedback may be used to determine matching page objects. Machine learning, heuristics analysis, and regression analysis may be used in matching page objects and associating metapage objects to the matching page objects, as described herein.

FIG. 1 illustrates a high level block diagram of a process of generating a metapage object in a social networking system, in one embodiment. The social networking system 100 generates a metapage object 102 after page objects 104 are found to be a match 108. An association 112 is generated between the page objects 104 and the metapage object 102 after a match 108 is determined from analyzing the page objects 104. User profile objects 106 that represent users of the social networking system 100 may be associated with page objects 104 based on actions 110 performed on the page objects 104 by the users. Each user of the social networking system 100 is associated with a specific user profile object 106. User profile objects 106 include declarative information about the user that was explicitly shared by the user and expressed in an action on objects in the social networking system 100. In one embodiment, a user profile object 106 may include thirty or more different data fields, each data field describing an attribute of the corresponding user of the social networking system 100. A viewing user is associated with a viewing user profile object 114 in the social networking system 100.

FIG. 1 and the other figures use like reference numerals to identify like elements. A letter after a reference numeral, such as "104a," indicates that the text refers specifically to the element having that particular reference numeral. A reference numeral in the text without a following letter, such as "104," refers to any or all of the elements in the figures bearing that reference numeral (e.g. "104" in the text refers to reference numerals "104a," "104b," and/or "104c" in the figures). Only three page objects 104 are shown in FIG. 1 in order to simplify and clarify the description.

Page objects 104 may be analyzed to determine if there is a match 108 between the page objects 104. Methods of determining a match 108 between page objects 104 include using a third-party database or website that includes links of other third-party web pages about a specific topic to generate a metapage object 102 and associations 112 with matching page objects 104 based on the links to the third-party web pages. The links to the other pages may represent other page objects 104 in the social networking system 100.

Another method of determining matching page objects 104 includes identifying shared attributes of page objects 104, such as title, actors, directors, and year for a movie associated with page objects 104 and generates a match score. If the generated match score exceeds a predetermined threshold, then the page objects 104 are determined to be a match 108a. Other methods of determining matching page objects 104 include inexact matching, including fuzzy matching that accounts for misspellings and closeness matching to match locations based on geographic closeness, and using feedback from users and administrators of pages on the social networking system 100 to make a determination of a match 108.

Yet another method of determining matching page objects 104 includes a simultaneous matching of the page objects 104. For example, suppose that a first page object representing the "Bridesmaids" movie on an external website, such as IMDB.com, includes as attributes of the first page object the year of the movie and a reference to a second page object representing the lead actress of the movie, Kristen Wiig. A third page object representing the "Bridesmaids" movie on a different external website, such as rottentomatoes.com, may be simultaneously matched to the first page object while a fourth object representing the lead actress, Kristen Wiig, on rottentomatoes.com may be simultaneously matched to the second object representing the same actress based on the same lead actress being referenced for the same movies.

After a page object 104 is associated with a metapage object 102, performed actions 110 associated with the page object 104 and that were performed by users associated with user profile objects 106 may be aggregated to count the total number of performed actions 110 to be associated with the metapage object 102, in one embodiment. For example, users may express interest in various pages that are represented by page objects 104 in the social networking system 100. As a user expresses interest in a page, an edge representing a performed action 110 with the page object 104 is generated by the social networking system 100 to connect the user profile object 106 associated with the user with the page object 104. As other users interact with the page represented by the page object 104, an aggregation of interactions with the page may be displayed on the page to identify to the viewing users how popular the web page has been amongst other viewing users. In one embodiment, the total number of interactions, aggregated across matching page objects 104 associated with the metapage object 102, may be displayed on a page associated with one of the matching page objects 104. As a result, the popularity of a concept, even though expressed on several pages, may be accurately represented on each of the pages using a metapage object to aggregate the social information on the pages.

A metapage object 102 associated with matching page objects 104 may also used as a central repository for information about a concept, in one embodiment. For example, an address missing from a page object 104 that represents a business, such as a restaurant, may be obtained from another page object 104 that has been determined to be a match. A metapage may be generated on the social networking system 100 in association with a metapage object 102. The metapage may merge selected content from pages associated with page objects 104 that have generated associations 112 with the metapage object 102, in one embodiment. Pages associated with matching page objects 104 may be listed on the metapage for the metapage object on the social networking system 100.

In another embodiment, a page determined to be the best page for the concept may be used as the metapage on the social networking system 100 for the metapage object 102. A page on the social networking system 100 associated with a metapage object 102 may be used as the metapage for the metapage object 102 associated with the page objects 104 for matching pages on the social networking system 100 based on the viewing user's information. For example, a viewing user based in the United States that searches for "Eiffel" among pages in the social networking system 100 may be looking for a page about "The Eiffel Tower." On the other hand, a viewing user based in France that performs the same search may be looking for a page about "Le Tour Eiffel." Thus, the best page for a metapage object 102 may vary depending on information about the viewing user, in one embodiment.

Similarly, a page may be selected for a viewing user based on information about users connected to the viewing user. For example, the viewing user may be connected to users that have expressed interest in a page that has not been determined to be the best page for the metapage object. As a result, the viewing user may be presented with the page in which connected users have expressed interest, overriding the best page determined for the metapage object.

System Architecture

Figure 2:
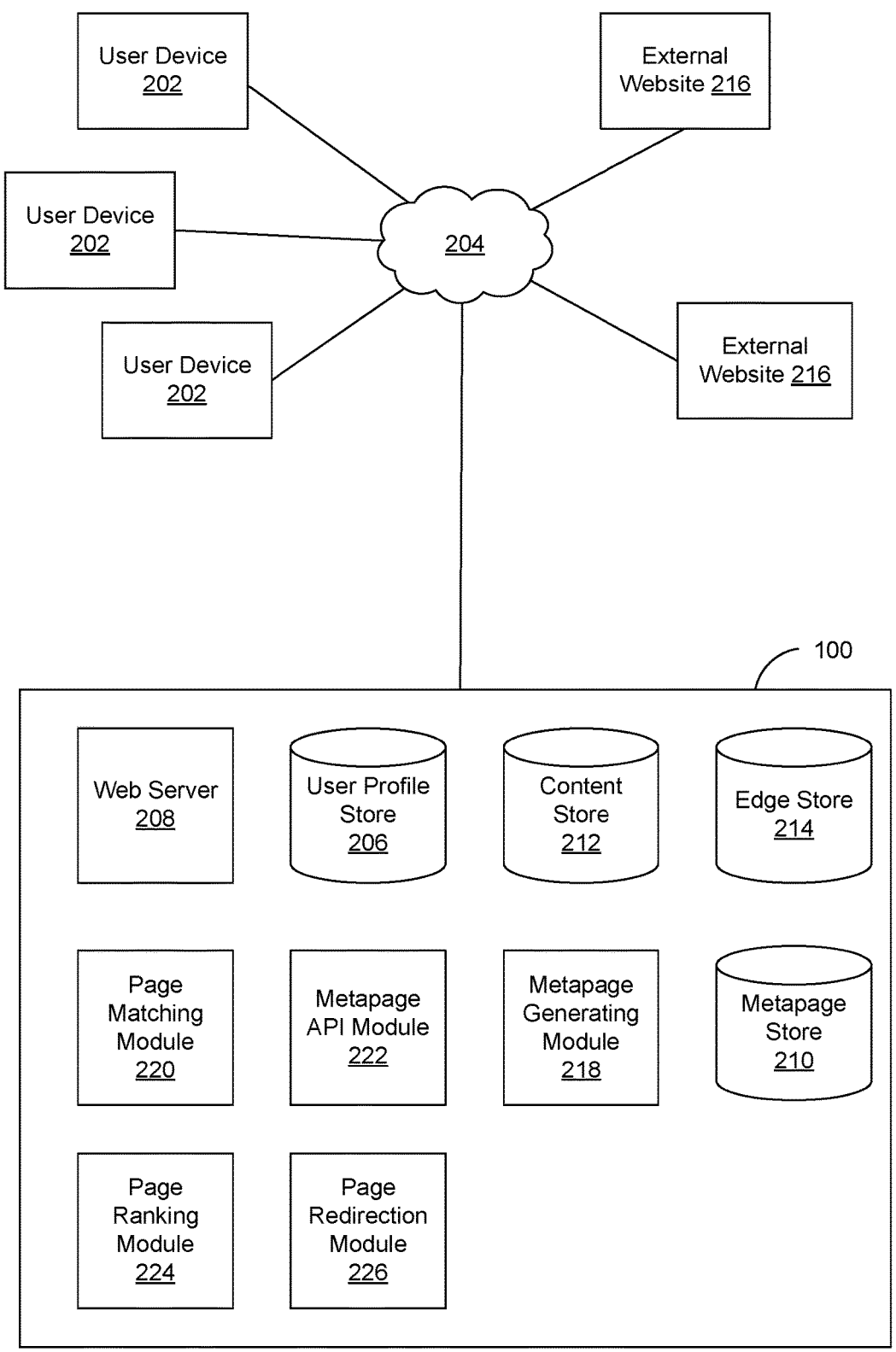
FIG. 2 is a network diagram of a system for enabling preference portability for users of a social networking system, showing a block diagram of the social networking system, in accordance with an embodiment of the invention.

FIG. 2 is a high level block diagram illustrating a system environment suitable for enabling preference portability for users of a social networking system, in accordance with an embodiment of the invention. The system environment comprises one or more user devices 202, the social networking system 100, a network 204, and external websites 216. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS 4 and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, a metapage store 210, a content store 212, an edge store 214, a metapage generating module 218, a page matching module 220, a metapage API module 222, a page ranking module 224, and a page redirection module 226. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

A page matching module 220 uses various methods of determining whether page objects 104 represent equivalent concepts in the social networking system 100, as described above. After page objects 104 are determined to be a match by the page matching module 220, a metapage object 102 is generated by a metapage generating module 218. Metapage objects 102 generated are stored in the metapage store 210. Page objects 104 may be stored as content objects in the content store 212. Page objects 104 may be associated with external websites 216 as well as pages within the social networking system 100.

A metapage API module 222 responds to application programming interface (API) calls for preferences information of users of the social networking system 100. In one embodiment, the metapage API module 222 responds to requests for a specific node in the social networking system 100 and user interests related to that node. For example, administrators of an online music streaming website may wish to identify the total user interest in a new song, "Bad Romance" by Lady Gaga, across multiple music websites. As a result, the administrators of the online music streaming website may make an API call requesting this information, identifying the song by name and artist. The metapage API module 222 may respond with the user preferences information in the format requested by the online music streaming website.

In another embodiment, the metapage API module 222 responds to requests for a specific user's interests as well as the interests of other users connected to the user. For example, third-party developers of a movie website may desire to compare user interests in movies that are currently playing and display the information in a side-by-side comparison based on the expressed interest in movies across multiple domains. The movie information website may make API calls to the social networking system 100 requesting this user preference information. The metapage API module 222 responds to the API calls with the requested information.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users.

A metapage generating module 218 may populate a newly-generated metapage object with information extracted from page objects associated with the metapage object. For example, a page object may exist for a gym, but the page object may be missing content, such as an exact address, contact information, and exercise class schedules, while including other information, such as users that have expressed an interest in the gym. Another page object representing the same gym may include this information as well as reviews of classes. A further page object, representing the brand of the gym, may offer application content not available on the other page objects. As such, the metapage object representing the gym may be populated with all of the information available from the three page objects.

A page ranking module 224 may rank page objects associated with a metapage object to determine the best page for a user, in one embodiment. For example, page objects describing the Eiffel Tower may be associated with a metapage object for the Eiffel Tower. Based on the user's profile information, the page objects describing the Eiffel Tower may be ranked to present the best page for the user. If the user's language preference is set to French, for example, the best page for that user would be a page object associated with "Le Tour Eiffel," a page describing the Eiffel Tower in French. Other profile information about users of the social networking system, including preferences, geographic locations where users are based, networks in which users are included, affinity scores for other users, and behavioral information recorded from users' actions on and outside of the social networking system, may be used in ranking the page objects to determine the best page for the user.

The page ranking module 224 may be used by other modules in determining the best page for a user. Returning to a previous example, suppose that a user performs a search for "Eiffel" on the social networking system. The highest ranked page for that user may be "The Eiffel Tower" because the user may be located in the United States. On the other hand, the highest ranked page for a user located in France may be "Le Tour Eiffel." In one embodiment, the search may only return the highest ranked page selected for that user, collapsing other pages in a "other similar pages" link. In another embodiment, the highest ranked page for the user may be determined according to preferences of the user's connections. Thus, if a user is located in France but is connected to many users that have expressed an interest in "The Eiffel Tower," then the highest ranked page for that user may be "The Eiffel Tower." Other information in the user's profile may be used to determine the best page for the user, such as language setting, whether other users connected to the user expressed an interest in a page, and demographic information matching other users that expressed an interest in a page.

In another embodiment, the page ranking module 224 ranks a cluster of page objects associated with a metapage object to determine the best page for that cluster. For example, fans of Justin Bieber may individually create pages on the social networking system 100 for Justin Bieber, creating a community of pages dedicated to the singer. In addition, a page may be created by a business or official entity, e.g., the publicity firm for Justin Bieber, and encyclopedia entries may be represented as pages on the social networking system 100, such as Wikipedia articles about "Justin Bieber" in English, French, and Spanish. The best page for the cluster may be selected according to a hierarchy of rules, in one embodiment. Authentic pages, owned by a business or official entity, are selected first amongst the pages associated with the metapage object. Next, pages that are sourced from third-party encyclopedic websites, such as Wikipedia, are selected from the pages within the viewing user's locale associated with the metapage object. For example, a page associated with an encyclopedia entry about Justin Bieber for users based in the U.S. would be selected for viewing users located in the U.S. if there were no official page associated with Justin Bieber on the social networking system 100. If there are no pages within the viewing user's locale that are sourced from third-party encyclopedic websites, then pages sourced from third-party encyclopedic websites not within the viewing user's locale are next selected as the best page for the community page. In one embodiment, pages that are associated with networks and communities, such as network pages for a high school, may be selected as the best page if no third-party encyclopedic pages can be sourced. Finally, inauthentic pages created by users in the social networking system 100 may be selected as the best page for the community. If multiple matching pages exist for each rule, the page with the largest number of fans, i.e. users that have expressed an interest in the page, is selected as the best page. In one embodiment, a link to the selected best page is provided on each of the pages in the cluster of pages associated with the community page.

In a further embodiment, the page ranking module 224 may select the best page for a topic or concept on a third-party website. For example, a third-party website may have multiple pages for a certain topic, such as multiple versions of pages corresponding to multiple releases of a movie. The best page for that movie on that third-party website may be determined by the page ranking module 224 based on third-party developer provided rules, in one embodiment. In another embodiment, the best page for a third-party website may be selected by the social networking system 100 according to the rules outlined above.

In yet a further embodiment, the page ranking module 224 may select the best page for a viewer of a user's profile page. For example, a user may express an interest in "Baseball," represented by a page on the social networking system 100. This interest may be provided on the profile page for the user. A viewer of the user's profile may have language preferences set to Spanish. Thus, "Beisbol," the Spanish equivalent of the "Baseball" interest page, may be selected as the best page for the viewer of the user's profile. As a result, the viewer of the user's profile may see that the user is interested in "Beisbol" even though the user actually expressed an interest in the page for "Baseball" because the page for "Beisbol" and the page for "Baseball" are associated with a metapage object for "Baseball."

A page redirection module 226 may operate in conjunction with other modules of the social networking system 100 to redirect users to the best page of the cluster of pages associated with the metapage. For example, a user may have expressed an interest in an inauthentic page for the movie "Star Warz," created by a user of the social networking system. As a result, a content item describing this expression of interest by the user in "Star Warz" may be shared with other users of the social networking system 100, but with an option for the other users to express an interest in "Star Wars," a page created by the official entity for the movie, instead of the page for "Star Warz." The page redirection module 226 generates this option in conjunction with modules of the social networking system 100 that share the content item with the other users connected to the user expressing the interest in "Star Warz."

In another embodiment, the page redirection module 226 may provide users with an option to express an interest in the best page for the cluster of pages associated with a metapage object after the users have expressed an interest in a page associated with the metapage object. For example, a user may express an interest in an external website for selling concert tickets to a local Bon Iver concert in Berkeley, Calif. After the user performed this action on the page associated with the Bon Iver metapage, the page redirection module 226 may further prompt the user to express an interest in the best page selected for Bon Iver. In one embodiment, the social networking system 100 may track user behaviors on external websites, such as engaging with a website for the concert tour of Bon Iver for a period of time, purchasing concert tickets, sharing links about the tour, and the like. By tracking these user behaviors, the social networking system 100 may infer an interest in Bon Iver and provide the user with a suggestion to express an interest in the best page selected for Bon Iver. In one embodiment, the best page selected for a concept may be referred to as a canonical entity.

In one embodiment, universal social context may be generated for a user viewing pages associated with a metapage object that identifies other users connected to the user that have expressed an interest in those pages. For example, the number of users expressing an interest in a page for an external website selling concert tickets to a local Bon Iver show may be small, under 200 "likes," or expressions of interest. A viewing user of the external website may be discouraged that none of the viewing user's friends on the social networking system are interested in attending the Bon Iver concert. However, universal social context may be used to provide a better understanding of the viewing user's interests. The best page for Bon Iver, determined by the social networking system as the page owned by an official entity associated with Bon Iver, may have a large number of users expressing interest in the band, such as over 600,000 likes, 20 of which are likes by users connected to the viewing user, and 8 of which are likes by users living near the concert venue. Thus, the 8 users that are connected to the viewing user that have expressed an interest in the band "Bon Iver" and that live near the concert venue may be provided in the page for the external website selling concert tickets to Bon Iver because the pages are associated with the metapage object for Bon Iver.

Universal social context information may also be provided on pages in the social networking system 100 to viewing users, showing related social activity for external websites, external systems, and social networking systems. For example, a user viewing the page for Bon Iver may be provided with songs recently listened to by other users connected to the user on a music streaming service by Bon Iver, albums purchased by friends of the user on a digital music website or subscription service, concert reviews posted by other users of the social networking system, and so forth. In one embodiment, social context information comprises selected actions performed by other users of the social networking system connected to a viewing user that are ranked according to relevancy to the page being viewed by the viewing user. For example, a viewing user that is viewing a page for selling concert tickets to Bon Iver may be less interested in a link shared by a connected user that describes indie folk music generally and more interested in a concert review of a recent Bon Iver concert by another connected user. As such, actions may be selected as universal social context information for a page being viewed by a user based on its ranked relevancy to the page.

In another embodiment, actions may be ranked and selected as universal social context information according to affinities of the user. Affinity may be determined by the social networking system by observing user behavior with other nodes on the social networking system. For example, a user may have a strong affinity for a subset of other users connected to the user on the social networking system, evidenced by an above average engagement with the subset of other users. As a result, the actions of the subset of other users connected to the user may be more influential on the user, providing better social context information to the user for a page.

Universal social context information may also be provided on user profiles to provide an insight into the shared interests of a user's connections. For example, if a user professes an interest in the San Francisco Giants, related actions of other users connected to the user, such as check-in events at AT&T Park in San Francisco, links shared about players on the team, and social gaming applications installed by the other users that are related to fantasy baseball teams, may be provided on the user's profile as universal social context information. In one embodiment, a social context feed may be embedded as a widget on external websites. For example, third-party developers for the external website for the San Francisco Giants may embed a social context feed widget into the external website so that, as users of a social networking system visit the external website, related actions by other users connected to the visiting users may be provided in the social context feed widget.

In addition, universal social context information may be used in redirecting a user to a particular page in which other users connected to the user expressed an interest by the page redirection module 226. The social context page redirection may be integrated in a social plugin embedded on an external web site associated with a different page related to the particular page, a content item about another user expressing an interest in a metapage that is associated with the particular page, as well as sponsored stories selected as advertisements to users of the social networking system.

Determining Matching Pages on a Social Networking System

Figure 3:
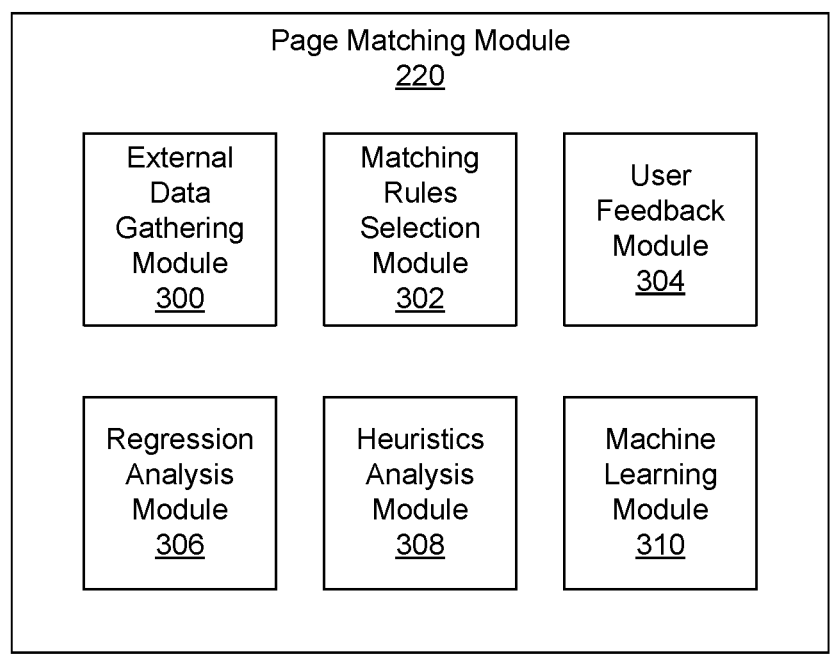
FIG. 3 is high level block diagram illustrating a page matching module that includes various modules for determining matching pages in a social networking system, in accordance with an embodiment of the invention.

FIG. 3 illustrates a high level block diagram of the page matching module 220 in further detail, in one embodiment. The page matching module 220 includes an external data gathering module 300, a matching rules module 302, a user feedback module 304, a regression analysis module 306, a heuristics analysis module 308, and a machine learning module 310. These modules may perform in conjunction with each other or independently to develop a match scoring model of matching pages on a social networking system 100.

An external data gathering module 300 interfaces with external websites 216 to process information about page objects 104 of the social networking system 100. This information may include content on a third-party website and other data licensed from third-party providers. Links extracted from the third-party website are analyzed to identify other websites describing the same concept. Third-party data providers may license information about websites to a social networking system that describe equivalent concepts. In one embodiment, the external data gathering module 300 may process the information retrieved from external websites 216 in a batch process asynchronously from the page matching module 220.

A matching rules selection module 302 selects rules for matching page objects in the social networking system 100. The page matching module 220 may use several matching rules in determining a match score for a plurality of page objects 104. Weights, or coefficients, may be assigned to the matching rules such that a particular rule may have more weight than another. The matching rules selection module 302 operates in conjunction with the other modules of the page matching module 220 to determine these weights, in one embodiment. In another embodiment, the matching rules selection module 302 selects which matching rules to use in determining whether page objects represent equivalent concepts, resulting in a match. For example, a list of cross-referenced websites that represent the same concept may be generated by the external data gathering module 300. As a result, the page objects associated with the websites on the list of cross-referenced websites that represent the same concept may all be determined to be a match without the need to calculate a match score because of a heavily weighted rule. In one embodiment, a match score of 100% would be determined for the page objects that are associated with the websites on the list of cross-referenced websites that represent the same concept.

The matching rules selection module 302 may, in another embodiment, select a set of matching rules for use in a match scoring model developed by the regression analysis module 306. The selection of matching rules may be manually selected by administrators of the social networking system 100, in one embodiment. In another embodiment, matching rules may be selected to be used in the match scoring model based on user feedback received via the user feedback module 304 that affirms or disaffirms a determined match. In yet another embodiment, all of the matching rules may be selected to be incorporated into the match scoring model.

Matching rules may include, in one embodiment, analyzing attributes of the page objects to identify matching attributes. Page objects may be associated with a graph object type that has been defined to have multiple attributes, or object properties. For example, a movie object type may be defined to have properties such as a director object type, a producer object type, a lead actor type, and the like. A matching rule may require that at least two of the attributes of a movie object type be the same in order for two page objects to be a match. Another matching rule may specify which attributes of the graph object type must match, such as the title, year, and lead actor of a movie. Yet another matching rule may define a predetermined threshold match score that must be met or exceeded based on other matching rules. For example, page objects that match on title and year may be assigned a 95% match score based on the likelihood that the page object match. This probability may be calculated by the regression analysis module 306 or by the machine learning module 310 in observing past matches and user feedback received from the user feedback module 304. On the other hand, page objects that match only on lead actor and year may be assigned a 38% match score, for example, based on the number of movies that the lead actor had been cast in that year. As a result, the page objects having a 38% match score may not be determined as a match according to the matching rule defining a predetermined threshold match score.

The regression analysis module 306 uses a regression model to match pages on the social networking system 100. In one embodiment, a match scoring model uses regression analysis to determine weights for matching rules in the match scoring model. For example, an initial weight may be assigned to the matching rule above in which the title, year, and lead actor matched between two page objects. The initial weight may be adjusted up or down based on user feedback received from users affirming or disaffirming the match using regression analysis. Using a combination of the matching rules, the regression model assigns a coefficient to each of the matching rules based on user feedback and probability of a match. In one embodiment where a metapage object is already associated with page objects and a new page object is being analyzed, the regression analysis module 306 determines a match score that indicates whether a page object is a good fit with other page objects associated with the metapage object. A curve fit, or best fit, yields a number from 0 to 1 that can be used as the accuracy measurement of the match. The regression analysis module 306, in one embodiment, adapts the regression model to include or exclude matching rules that are determined to be relevant or not relevant to matching equivalent pages based on machine learning and heuristics analysis of the representative page objects.

A heuristics analysis module 308 operates independently and asynchronously from the other modules in the page matching module 220. The heuristics analysis module 308 performs various steps to gather information from the social networking system 100. For example, an action log includes actions that users perform on the social networking system. The heuristics analysis module 308 may be used to analyze the level of communications activity for pages on the social networking system to determine whether those communications included certain keywords, such as "Justin Bieber," that may indicate the topic of page.

Another use of the heuristics analysis module 308 includes gathering and analyzing different types of information from the page objects being compared. For example, an administrators of page objects may post numerous links to external websites with information related to the topic of the page objects, such as a particular locale, such as Oahu, Hi. The heuristics analysis module 308 may gather and analyze these external websites and conclude that a particular locale was mentioned in all of the websites. As a result, the page objects may be associated with a metapage object generated for that locale.

In one embodiment, an assertion may be made by a user of the social networking system that two or more pages represent the same concept. The heuristics analysis module 308 may keep track of the assertions made by users and discount assertions made by users that have a low reputation score based on previous assertions made by those users. For example, an assertion may be made that a page about Manolo Blahnik shoes and a page dedicated to glass slippers may be made by a user as a joke. The heuristics analysis module 308 may analyze content on both page objects and determine that they are not a match. Based on the fraudulent assertion, the user's reputation score may be decreased. In the future, that user's reputation score will prevent a metapage from being generated because the user's reputation score did not meet a predetermined threshold reputation score.

In one embodiment, a plurality of metapage objects may be merged when a new metapage is created with existing pages. Various conflict rules may be used to merge a new metapage object with an existing metapage object, including confidence scores (matching scores) generated by the heuristics analysis module 308. A new metapage object may break old ties to page objects based on assertions that include reasons for breaking the old ties, such as inactive page objects and page objects that have low reputation scores.

A machine learning module 310 may be used in the page matching module 220 to refine the match scoring model defined in the matching rules selection module 302 and the regression analysis module 306. In one embodiment, a social networking system 100 uses a machine learning algorithm to analyze user feedback received from the user feedback module to retrain the match scoring model. The match scoring model may be refined to include more or less matching rules and the weights assigned to each matching rule, or coefficients, can also be adjusted based upon the user feedback.

Figure 4:
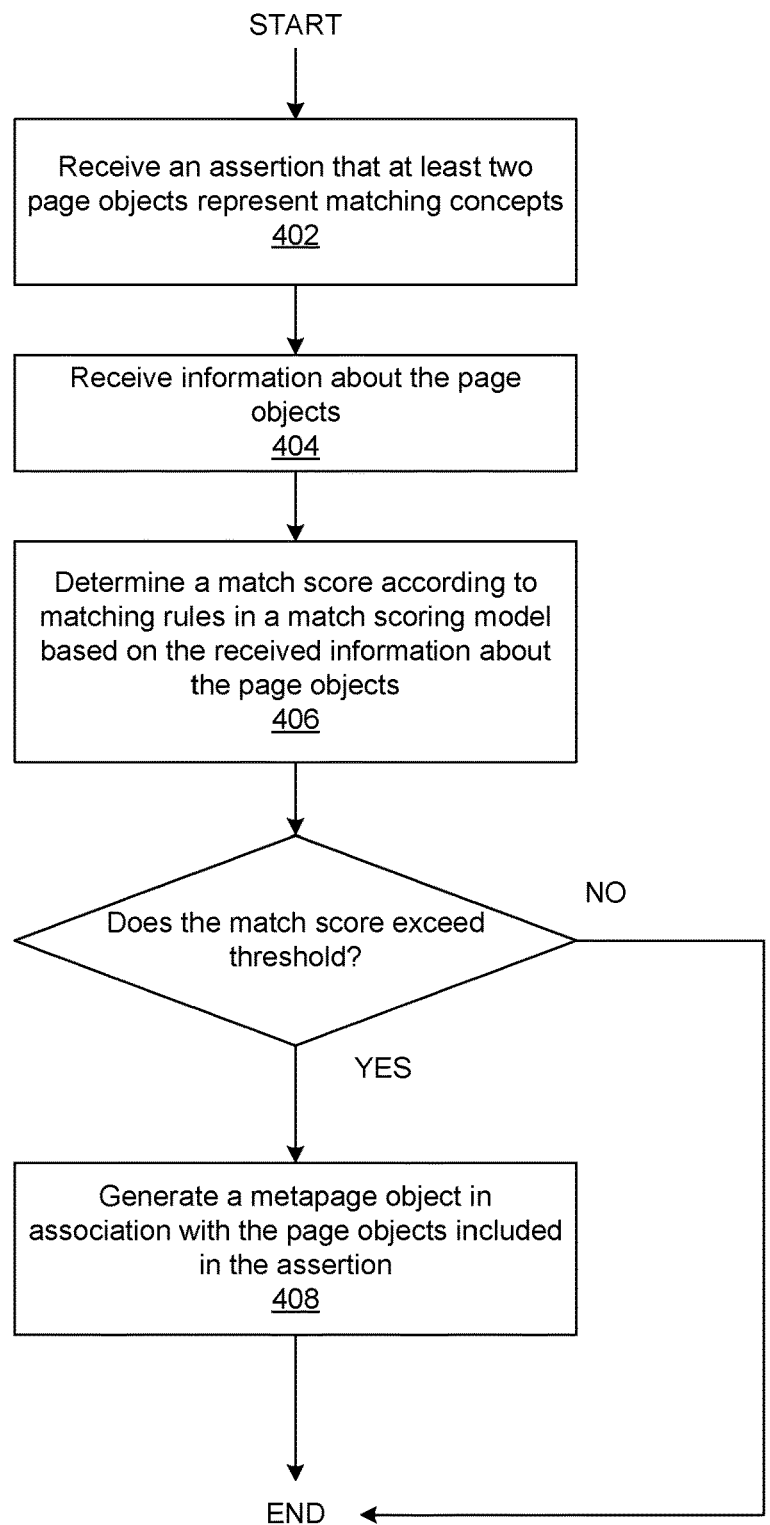
FIG. 4 is a flowchart of a process of determining matching pages in a social networking system, in accordance with an embodiment of the invention.

FIG. 4 illustrates a flow chart diagram depicting a process of generating a metapage object in a social networking system, in accordance with an embodiment of the invention. An assertion that at least two page objects represent matching concepts is received 402 by the social networking system 100. This assertion may be made by a user of the social networking system 100, in one embodiment. The assertion includes a user identifier, identifiers of the page objects, and a reason for the match. Information about the page objects is received 404. This information may include attributes about the page objects, other object associated with the page objects, external websites associated with the page objects, and other information from third-party providers. For example, a user may assert that two page objects are matching concepts for "Justin Bieber" even if one page object is titled "We are beliebers!" The reason included in the assertion may be that both page objects are fan pages of Justin Bieber.

After the information about pages of the social networking system is received 404, a match score is determined 406 according to matching rules in a match scoring model based on the received information about the page objects. An administrator may, in one embodiment, manually select the matching rules in the match scoring model, as discussed above, such as matching attributes and selected object properties using the page matching module 220. The page matching module 220 may select matching rules, in another embodiment, based on the results of regression analysis and user feedback regarding prior page objects. Returning to the example above, "belieber" may be a keyword that is directly associated with fans of Justin Bieber, evidenced by heuristic analysis of other page objects associated with Justin Bieber. After this discovery, the keyword "belieber" may be added as a manual matching rule, automatically matching page objects that include the keyword in the title, for example. In this sense, non-normalized concepts, such as the page object titled "We are beliebers" and the page object titled "Justin Bieber," may become normalized concepts, organized around a metapage object for Justin Bieber.

After a match score has been determined 406, a metapage object is generated 408 in association with the page objects included in the assertion if the match score exceeds a predetermined threshold. If the match score does not exceed the threshold, the process ends. The generated metapage object is stored in a database that is indexed by the identifier for the metapage objects. The generated metapage object also stores identifiers of the page objects included in the assertion. In this way, the generated metapage object may aggregate social information about its associated page objects by querying for the identifiers of the page objects. In one embodiment, an API call may be made from an external website to retrieve aggregated social information about page objects associated with a generated metapage object.

Enabling Preference Portability for Users of a Social Networking System

Figure 5:
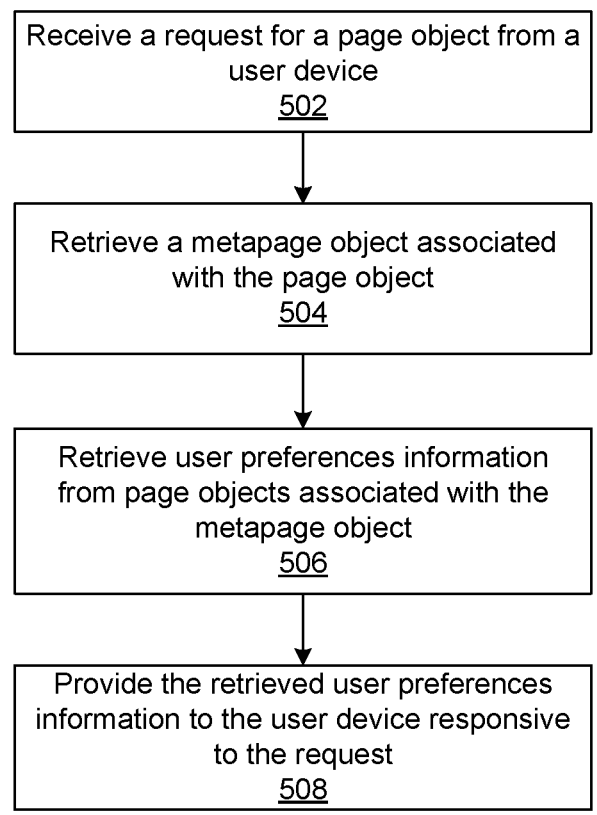
FIG. 5 is a flowchart of a process of providing user preferences for pages associated with a metapage in a social networking system, in accordance with an embodiment of the invention.

FIG. 5 is a flowchart diagram depicting a process of providing user preferences for pages associated with a metapage in a social networking system, in accordance with an embodiment of the invention. A request for a page object is received 502 from a user device. For example, a web browser on a user's personal computer may be loading a web page hosted on an external website 216 outside the social networking system 100. The web page may include an embedded code snippet or widget that requests the page object for the web page being loaded, such as an encyclopedia article about Britney Spears. The widget may not be visible on the web page, in one embodiment.

Responsive the request received 502 by the social networking system 100, a metapage object associated with the page object in the request is retrieved 504. As an example, the page object associated with the encyclopedia article about Britney Spears may be associated with a metapage object for the singer. Thus, the metapage object for Britney Spears would be retrieved 504 responsive to the request received 502 for the page object for the encyclopedia article about Britney Spears.

After the metapage object associated with the page object is retrieved 504, information about user preferences are retrieved 506 from page objects associated with the metapage object. For example, the widget embedded in the website encyclopedia article about Britney Spears may request information about the total number of users on the social networking system 100 that have expressed an interest in Britney Spears. This number may be segmented into users that are connected to the viewing user and users that are not connected to the viewing user, in one embodiment. As a result, this numeric information is retrieved 506 from page objects associated with the metapage object for Britney Spears. The total number may then be presented on the encyclopedia article after the social networking system 100 provides 508 the retrieved user preferences information to the user device responsive to the request.

In a further embodiment, the widget may request the viewing user's preference in the metapage object for Britney Spears based on interactions with page objects associated with the metapage object. Thus, if the viewing user had previously expressed an interest in a page about Britney Spears on the social networking system 100 that is represented by a page object associated with the metapage object, then the viewing user, upon opening the encyclopedia article for Britney Spears, is presented with information that the viewing user has already expressed an interest in the encyclopedia article on the external website 216. The viewing user's preference information is retrieved 506 from the page object associated with the page about Britney Spears on the social networking system because the page object is associated with the metapage object for Britney Spears. The encyclopedia article about Britney Spears may present the viewing user's preference information after it has been provided 508 to the user device responsive to the request. Thus, the user's preference for Britney Spears is made portable to the external website 216 hosting the encyclopedia article about Britney Spears.

The widget may, in another embodiment, request information about users connected to the viewing user interacting with a page object associated with Britney Spears. This information may be filtered by page objects associated with the metapage object for Britney Spears. For example, if users connected to the viewing user have shared a page post by an authenticated page for Britney Spears, this information may be provided to the widget separately from information about comments made by users connected to the viewing user on a website about Britney Spears that has not been authenticated. The information may also be filtered by action type. Returning to the example, the actions of sharing a page, commenting on a page and expressing interest in a page may be filtered by action type. As a result, the user preferences information about users connected to the viewing user may be retrieved 506 from page objects associated with the metapage object. The user preferences information about users connected to the viewing user may then be provided 508 to the user device responsive to the request.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining a plurality of pages on a social networking system, the plurality of pages describing a plurality of overlapping concepts;
   clustering, by a processor, the plurality of pages on the social networking system by concept;
   receiving a query for a concept from a user of the social networking system;

analyzing a user profile object associated with the user, the user profile object storing action information about actions taken by the user on page objects in the social networking system, the user profile object additionally pointing to edges of an edge store that indicate additional users to which the user is connected in the social networking system;

determining, by the processor, a best page for the user of a cluster of pages clustered by the queried concept, the determining based at least in part on:

the action information about the user stored in the user profile object associated with the user, and action information of the additional users to which the user is connected in the social networking system; and providing to the user the determined best page from the cluster of pages clustered by the queried concept.

2. The method of claim 1, wherein clustering the plurality of pages on the social networking system by concept further comprises generating a metapage for each concept, the metapage associated with a cluster of the plurality of pages representing the concept.

3. The method of claim 2, wherein determining, for the user, a best page of a cluster of pages clustered by the queried concept based at least in part on the information about the user further comprises:

retrieving a metapage corresponding to the queried concept;

retrieving the cluster of the plurality of pages associated with the metapage corresponding to the queried concept; and determining a best page from the retrieved cluster of the plurality of pages associated with the metapage corresponding to the queried concept based on attributes of the retrieved cluster of the plurality of pages and a plurality of user preferences retrieved from the information about the user.

4. The method of claim 1, wherein receiving a query for a concept from a user of the social networking system further comprises:

receiving the query for the concept from the user in a search query on the social networking system.

5. The method of claim 1, wherein determining, for the user, a best page of a cluster of pages clustered by the queried concept based at least in part on the information about the user further comprises:

retrieving preferences information for other users of the social networking system connected to the user; and determining the best page of the cluster of pages based on the retrieved preferences information for the other users of the social networking system connected to the user.

6. The method of claim 1, wherein determining, for the user, a best page of a cluster of pages clustered by the queried concept based at least in part on the information about the user further comprises:

retrieving preferences information for similar users of the social networking system compared to the user; and determining the best page of the cluster of pages based on the retrieved preferences information for the similar users of the social networking system connected compared to the user.

7. The method of claim 6, wherein similar users of the social networking system compared to the user comprises users of the social networking system that are in the same demographic as the user.

8. The method of claim 6, wherein similar users of the social networking system compared to the user comprises users of the social networking system that share similar affinity scores for interests as the user.

9. The method of claim 6, wherein similar users of the social networking system compared to the user comprises users of the social networking system that share behavioral patterns as the user.

10. The method of claim 1, wherein determining, for the user, a best page of a cluster of pages clustered by the queried concept based at least in part on the information about the user further comprises:

retrieving a geographic location for the user; and determining the best page of the cluster of pages based on the retrieved geographic location of the user.

11. The method of claim 1, wherein determining, for the user, a best page of a cluster of pages clustered by the queried concept based at least in part on the information about the user further comprises:

retrieving preferences information for the user, the preferences information including user-declared interests and inferred interests; and determining the best page of the cluster of pages based on the retrieved preferences information for the user.

12. A method comprising:

maintaining metapages on a social networking system, each metapage associated with a plurality of pages on the social networking system that describe an equivalent concept;

receiving a query for a concept from a user of the social networking system;

retrieving, by a processor, a metapage associated with a set of pages corresponding to the concept;

analyzing a user profile object associated with the user, the user profile object storing action information about actions taken by the user on page objects in the social networking system, the user profile object additionally pointing to edges of an edge store that indicate additional users to which the user is connected in the social networking system;

determining, by the processor, a best page for the user of a cluster of pages clustered by the queried concept, the determining based at least in part on:

the action information about the user stored in the user profile object associated with the user, and action information of the additional users to which the user is connected in the social networking system; and providing, as results of the query, the determined best page for the user and the set of pages corresponding to the concept to the user, where the set of pages are collapsed into a selectable link.

13. The method of claim 12, wherein determining, for the user, a best page from among the set of pages corresponding to the concept based at least in part on the information about the user further comprises:

retrieving a plurality of affinity scores for interests related to the concept in the social networking system for the user; and determining the best page based on the retrieved plurality of affinity scores for interests related to the concept in the social networking system for the user.

14. The method of claim 12, wherein determining, for the user, a best page from among the set of pages corresponding to the concept based at least in part on the information about the user further comprises:

retrieving a plurality of networks in the social networking system associated with the user; and determining the best page based on the retrieved plurality of networks in the social networking system associated with the user.

15. The method of claim 12, wherein determining, for the user, a best page from among the set of pages corresponding to the concept based at least in part on the information about the user further comprises:
retrieving information about other users connected to the user, the information including expressions of interest in pages of the set of pages corresponding to the concept; and
determining the best page based on the retrieved information about other users connected to the user, where the best page is determined as the page having a highest number of expressions of interest by the other users.

16. The method of claim 12, wherein determining, for the user, a best page from among the set of pages corresponding to the concept based at least in part on the information about the user further comprises:
retrieving behavioral information about a plurality of actions of the user inside and outside of the social networking system, the behavioral information including expressions of interest in pages of the set of pages corresponding to the concept and clicks on external websites; and
determining the best page based on the retrieved behavioral information about the user, where the best page is determined as the page having a highest number of actions by the user.

* * * * *